Aug. 28, 1923.

C. G. HARTLEY 1,466,164

ENGINE GOVERNOR

Filed Sept. 23, 1920

C. Glenn Hartley  Inventor

By A. G. Burns

Attorney

Patented Aug. 28, 1923.

1,466,164

UNITED STATES PATENT OFFICE.

CALVIN GLENN HARTLEY, OF ROANOKE, INDIANA, ASSIGNOR TO KNOX ENGINEERING AND MANUFACTURING COMPANY, A CORPORATION OF INDIANA.

ENGINE GOVERNOR.

Application filed September 23, 1920. Serial No. 412,271.

*To all whom it may concern:*

Be it known that I, CALVIN GLENN HARTLEY, a citizen of the United States of America, and resident of Roanoke, in the county of Huntington and State of Indiana, have invented certain new and useful Improvements in Engine Governors, of which the following is a specification.

This invention relates to improvements in engine governors and the object thereof is to provide a construction that is compact and encased and sensitive in action.

The object of the improvement is accomplished by the construction illustrated in the accompanying drawings in which.

Similar characters of reference indicate corresponding parts in both views and referring now to the same.

Figure 1:
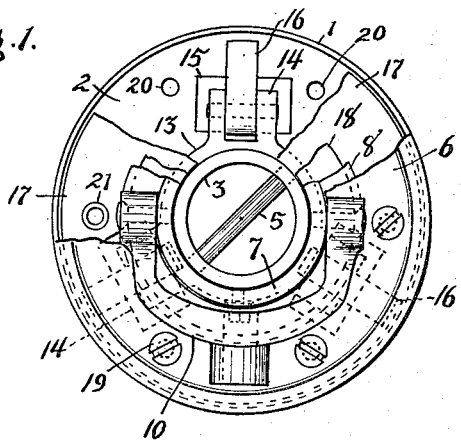
Fig. 1 is an end view of the governing device, parts thereof being shown broken away.
Figure 2:
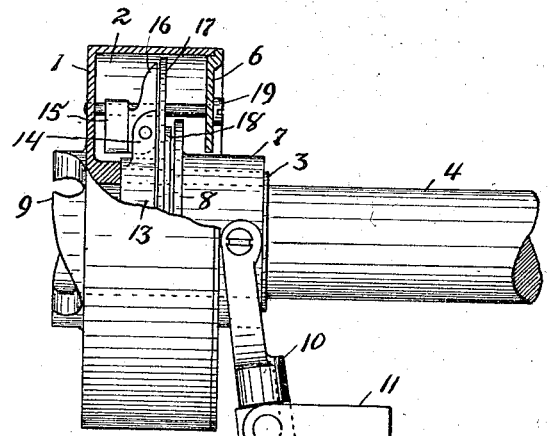
Fig. 2 is a side view of the same with a portion of the casing broken away and in section.
Figure 3:
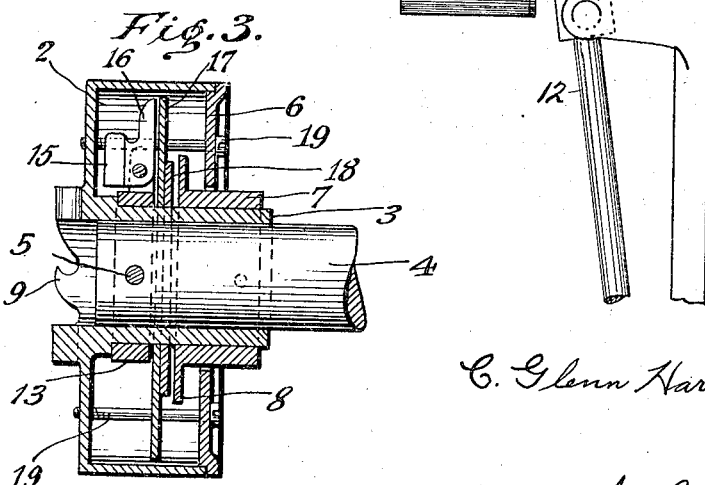
Fig. 3 is a central section showing the interior arrangement of parts.

1 is a case having therein an annular chamber 2 and a concentric hollow hub 3 into which the engine shaft 4 extends, the hub being secured to the shaft by means of a pin 5 extending therethrough. The back of the case is closed by an annular cover 6 through the center of which extends the governor sleeve 7, the latter being loosely mounted upon the hub 3 and having upon its inner end a radially extending flange 8. The case is of circular form and adapted to be employed also as a pulley for a fan-belt (not shown), and has upon its front end a series of jaws 9 adapted to be engaged by a starting crank (not shown) commonly employed for starting gas engines.

A forked lever 10 has pivotal connection with the governor sleeve 7 and hinged support on a bracket 11 and is arranged also in connection with a governor arm 12 so as to actuate the same. It is the intention that through the swinging movement of the governor arm the engine throttle (not shown) will accordingly be operated, and connection may be formed in any well known manner.

Within the chamber 2, upon the hub 3 is fixed a supporting spider 13 having a series of bifurcated lugs 14 in each of which is pivoted a governor member 15 which has an outwardly extending finger 16, and an annular bearing plate 17 is loosely mounted upon the hub 3 adjacent the spider and against which the fingers 16 are adapted to bear when the governor members 15 swing outwardly. Also, a friction ring 18 is loosely mounted on the hub 3 between the bearing plate 17 and the flange 8 of the governor sleeve.

The annular cover is held in place upon the case by a series of bolts 19 which extend through the cover and into threaded openings 20 in the front end of the case. There are also a series of openings 21 in the bearing plate 17 through which the bolts respectively pass, the openings being sufficiently large as to admit of limited movement of the plate.

In the operation of the invention the chamber 2 is filled with liquid lubricant so that the parts are constantly bathed with oil which insures sensitive action of the parts responsive to the centrifugal force developed due to the rotation of the engine. As the case revolves the governor members 15 tend to swing outwardly and the fingers 16 bear with corresponding force against the plate 17 causing the plate to press the friction ring 18 against the flange of the governor sleeve and impart movement thereto. As the sleeve is thus forced endwise the forked lever is rocked upon its pivotal support and the governor arm 12 is thereby actuated accordingly.

What I claim is:

In an engine governor, a revolving case having a central hub, a series of pivoted governor members supported within the case and revoluble therewith; a bearing plate longitudinally actuated by the governor members; a series of bolts in the case extending loosely through the bearing plate so that the bearing plate is caused to rotate with the case while being free to have longitudinal movement therein; a governor sleeve longitudinally movable on the hub; and a floating washer positioned between the bearing plate and the sleeve.

In testimony whereof I affix my signature, in presence of two witnesses.

C. GLENN HARTLEY.

Witnesses:
 MATILDA METTLER,
 W. G. BURNS.